United States Patent
Nakagawa et al.

(10) Patent No.: US 11,892,428 B2
(45) Date of Patent: Feb. 6, 2024

(54) LASER ABLATION DEVICE AND ANALYSIS APPARATUS

(71) Applicant: S.T.JAPAN INC., Tokyo (JP)

(72) Inventors: Takao Nakagawa, Tokyo (JP); Norio Yasuda, Tokyo (JP)

(73) Assignee: S.T.JAPAN INC., Tokyo (JP)

( * ) Notice: Subject to any disclaimer, the term of this patent is extended or adjusted under 35 U.S.C. 154(b) by 379 days.

(21) Appl. No.: 17/047,682

(22) PCT Filed: Apr. 18, 2018

(86) PCT No.: PCT/JP2018/016026
§ 371 (c)(1),
(2) Date: Oct. 14, 2020

(87) PCT Pub. No.: WO2019/202689
PCT Pub. Date: Oct. 24, 2019

(65) Prior Publication Data
US 2021/0162549 A1     Jun. 3, 2021

(51) Int. Cl.
*G01N 27/623* (2021.01)
*B23K 26/0622* (2014.01)
(Continued)

(52) U.S. Cl.
CPC ....... *G01N 27/623* (2021.01); *B23K 26/0624* (2015.10); *B23K 26/40* (2013.01);
(Continued)

(58) Field of Classification Search
CPC ........ G01N 27/623; G01N 1/04; G01N 1/286; G01N 1/38; G01N 2001/045; B23K 26/0624; B23K 26/40
See application file for complete search history.

(56) References Cited

U.S. PATENT DOCUMENTS

| 8,675,192 B2 | 3/2014 | Ugolin et al. |
| 10,175,684 B2 * | 1/2019 | Takahashi .......... B23K 26/0884 |
| 2004/0016888 A1 | 1/2004 | Haraguchi |

FOREIGN PATENT DOCUMENTS

| EP | 1043110 A2 | 10/2000 |
| EP | 1043110 A3 | 7/2004 |

(Continued)

OTHER PUBLICATIONS elm-chan.org/works/vlp/report_e.html, 2006 (Year: 2006).*
(Continued)

*Primary Examiner* — Thien S Tran
(74) *Attorney, Agent, or Firm* — HAUPTMAN HAM, LLP

(57) ABSTRACT

A laser ablation device is provided with: a laser light source that outputs a femtosecond pulse laser beam; an optical system that includes a first mirror rotatable about a first axis, a second mirror rotatable about a second axis, a first driving source for rotating the first mirror about the first axis, and a second driving source for rotating the second mirror about the second axis, and that reflects the laser beam from the laser light source toward a sample by the first mirror and the second mirror; and an irradiation controller that, on the basis of the two-dimensional coordinate position of an analysis position, controls the first driving source and the second driving source to irradiate the analysis position with the laser beam.

5 Claims, 8 Drawing Sheets

(51) Int. Cl.
*B23K 26/40* (2014.01)
*G01N 21/63* (2006.01)
*G01N 1/04* (2006.01)
*G01N 1/38* (2006.01)
*G01N 1/28* (2006.01)
*B23K 103/00* (2006.01)
*G01N 21/73* (2006.01)

(52) U.S. Cl.
CPC ............... *G01N 1/04* (2013.01); *G01N 1/286* (2013.01); *G01N 1/38* (2013.01); *G01N 21/63* (2013.01); *B23K 2103/54* (2018.08); *G01N 21/73* (2013.01); *G01N 2001/045* (2013.01)

(56) References Cited

FOREIGN PATENT DOCUMENTS

| FR | 2883977 A1 * | 10/2006 | ........... G01N 21/718 |
|----|---|---|---|
| JP | H5119244 A | 5/1993 | |
| JP | H772047 A | 3/1995 | |
| JP | H11103150 A | 4/1999 | |
| JP | 2003247920 A | 9/2003 | |
| JP | 2013130492 A | 7/2013 | |
| JP | 201471160 A | 4/2014 | |
| JP | 2015504161 A | 2/2015 | |
| JP | 2016517523 A | 6/2016 | |
| JP | 2016522887 A | 8/2016 | |
| JP | 2017193060 A | 10/2017 | |
| WO | 2018026910 A1 | 2/2018 | |

OTHER PUBLICATIONS

FR-2883977-A1 (Year: 2006).*
Beatriz Fernandez et al., "Direct Determination of Trace Elements in Powdered Samples by In-Cell Isotope Dilution Femtosecond Laser Ablation ICPMS", Analytical Chemistry, Sep. 15, 2008, 6981-6994 pages, vol. 80, No. 18, 14pp.
International Search Report in PCT Application No. PCT/JP2018/016026, dated Jul. 10, 2018, 4pp.
Extended European Search Report in EP Application No. 18915539.3, dated Oct. 27, 2021, 8pp.

* cited by examiner

LASER ABLATION DEVICE AND ANALYSIS APPARATUS

RELATED APPLICATIONS

The present application is a National Phase of International Application No. PCT/JP2018/016026, filed Apr. 18, 2018.

TECHNICAL FIELD

The present invention relates to a laser ablation device which ablates a sample and an inductively coupled plasma type analysis apparatus having the laser ablation device, and more particularly, to a laser ablation device and an analysis apparatus suitable for use with a solid sample.

BACKGROUND ART

As a technique for performing qualitative and quantitative analysis of elements by observing and analyzing light from excited atoms by applying a high voltage to an ionic or particulate sample thereby being changed to plasma, an inductively coupled plasma (ICP) type analysis technique is known in the art. A technique described in Non-Patent Document 1 below is known as the ICP type analysis technique.

Non-Patent Document 1 (Fernandez et al.) describes a technique using mass spectrometry (MS) in an inductively coupled plasma method for performing an identification of multi-elements such as copper, zinc, tin, and lead contained in soil. In Non-Patent Document 1, when ablating a solid sample to make it into an aerosol, a femtosecond laser is used to shorten the time taken for the whole analysis.

PRIOR ART DOCUMENT

Patent Document

[Non-Patent Document 1]
Fernandez and four other persons, "Direct Determination of Trace Elements in Powdered Samples by In-Cell Isotope Dilution Femtosecond Laser Ablation ICP MS", Anal. Chem., 2008, 80, 6981-6994

SUMMARY OF INVENTION

Problems to be Solved by Invention (Problems with the Prior Art)
In the technique described in Non-Patent Document 1, an irradiation position of a laser beam can be moved substantially only on one axis (on a long elliptical arc-shaped circumference), and when it is desired to analyze a plurality of arbitrary locations of the sample, it is necessary to arrange the plurality of locations on one axis where the laser beam can move. Therefore, in one lumped sample such as mineral, etc., if there are three or more locations to be analyzed, it is difficult to arrange the sample on one axis. Thereby, when it is desired to change the analysis position, it is necessary to replace the position of the sample, and there is a problem that the time taken for the whole analysis is longer.

Further, in the technique described in Non-Patent Document 1, even when it is desired to mix and analyze a plurality of samples, it is also necessary to arrange the samples to be mixed on one axis, and it is necessary to place two (or more) samples within a movable range of the laser beam. In particular, in the technique described in Non-Patent Document 1, since it is to be such a motion in which the laser beam reciprocates on a trajectory (a so-called track-shaped trajectory of athletic sports) along the elliptical arc-shaped circumference at a predetermined speed, there is also a problem that a mixing ratio of the two samples is limited only to a specific mixing ratio.

Therefore, the technique described in Non-Patent Document 1 has a problem that there are restrictions in a position where the sample is placed and a position where analysis can be performed.

It is a technical object of the present invention to widen the position where a sample is placed and the position where analysis can be performed, as compared to a conventional configuration.

Means for Solving Problems

In order to solve the above technical object, an invention of a first aspect of the present invention provides a laser ablation device including:

a laser light source configured to output a laser beam for ablating a sample housed in a cell, wherein the laser light source outputs a femtosecond pulse laser beam having a pulse width of a femtosecond order;

an optical system configured to reflect the laser beam from the laser light source toward the sample, wherein the optical system comprises: a first mirror rotatable about a first axis; a second mirror rotatable about a second axis which is different from the first axis; a first driving source configured to rotate the first mirror about the first axis; and a second driving source configured to rotate the second mirror about the second axis; wherein the laser beam from the laser light source is reflected by the first mirror, and the laser beam reflected by the first mirror is reflected by the second mirror toward an analysis position of the sample; and an irradiation control means configured to control the first driving source and the second driving source based on a coordinate position on two dimensions of the analysis position of the sample to change reflection angles of the first mirror and the second mirror, such that the analysis position is irradiated with the laser beam.

An invention of a second aspect of the present invention provides the laser ablation device according to the first aspect of the present invention, wherein, when mixing and analyzing the sample at a plurality of analysis positions, an interval between the laser beams irradiated to the sample is set to a predetermined low frequency, and when analyzing each of the plurality of analysis positions individually, the interval between the laser beams irradiated to the sample is set to a predetermined high frequency.

An invention of a third aspect of the present invention provides the laser ablation device according to the first or second aspect of the present invention, including the irradiation control means configured to, when driving the respective driving sources according to the analysis positions, drive the driving sources toward stop positions, and then perform driving in a reverse direction to a direction in which they move toward the stop positions when stopping them at the stop positions, thus to stop the respective mirrors at the stop positions.

In order to solve the above technical object, an invention of a fourth aspect of the present invention provides an analysis apparatus including:

a cell configured to house a sample;

the laser ablation device according to any one of the first to third aspects of the present invention, which is configured to ablate the sample; and a spectrometer into which the sample that has been ablated and sent out from the cell is introduced, and which is configured to perform an analyses of the introduced sample by an inductively coupled plasma method.

Advantageous Effects

In accordance with the inventions according to the first and fourth aspects of the present invention, it is possible to move an irradiation position of the laser beam in two dimensions by operating two mirrors with two driving sources, and thereby it is possible to widen the position where the sample is placed and the position where the analysis can be performed.

In accordance with the invention according to the second aspect of the present invention, it is possible to perform different analyses using one laser ablation device by changing an interval between the laser beams.

In accordance with the invention according to the third aspect of the present invention, it is possible to improve an accuracy of the position irradiated with the laser beam, as compared to the case in which the driving in the reverse direction is not performed.

BRIEF DESCRIPTION OF DRAWINGS

FIGS. 5A to 5D are views describing an analysis mode that can be performed by the analysis apparatus of Embodiment 1, wherein FIG. 5A is a view describing an integration analysis mode, FIG. 5B is a view describing a mixing analysis mode, FIG. 5C is a view describing an elemental imaging analysis mode, and FIG. 5D is a view describing a quantitative analysis mode.

FIGS. 8A and 8B are views describing modifications of a diffusion part of the cell, wherein FIG. 8A is a view describing Modification 1, and FIG. 8B is a view describing Modification 2.

MODE FOR CARRYING OUT INVENTION

Hereinafter, an embodiment which is a specific example of embodiments of the present invention will be described with reference to the drawings, but the present invention is not limited to the following embodiment.

Further, in the following description using the drawings, members other than members necessary for the description to facilitate the understanding will not be illustrated and described.

Embodiment 1

Figure 1:
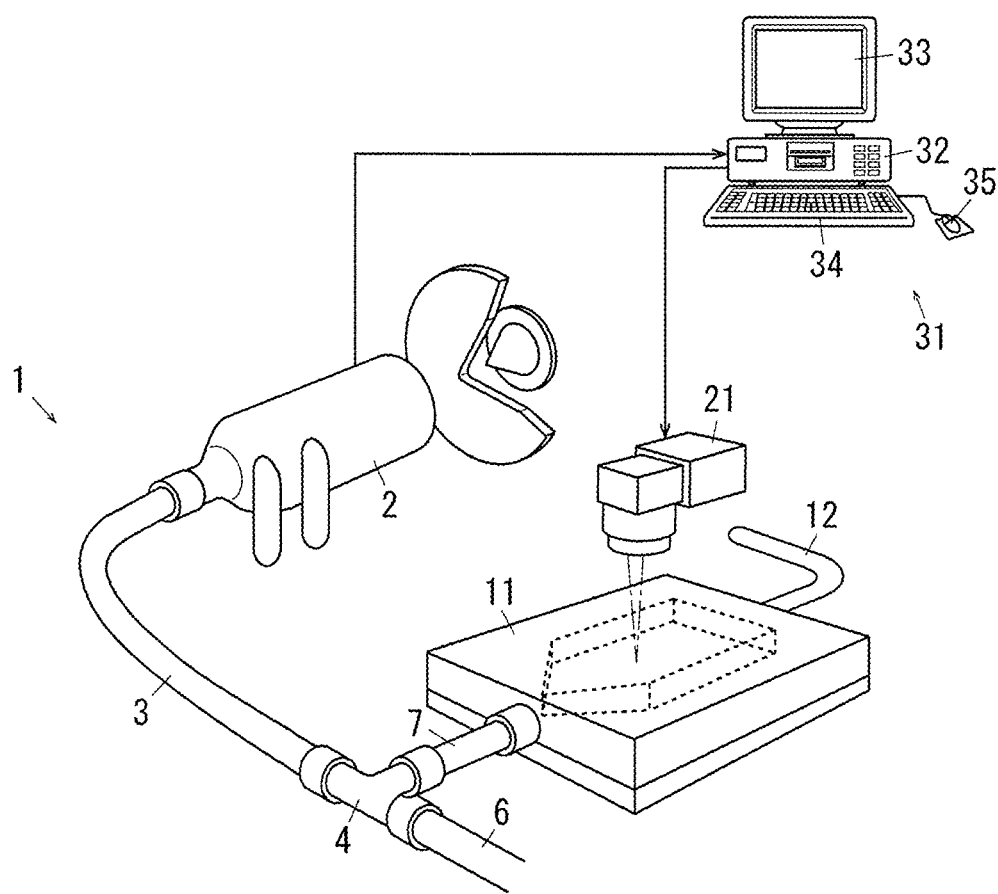
FIG. 1 is an entire view describing an analysis apparatus of Embodiment 1 of the present invention.

FIG. 1 is an entire view describing an analysis apparatus of Embodiment 1 of the present invention.

In FIG. 1, an analysis apparatus 1 of Embodiment 1 has a mass spectrometer 2 as an example of a spectrometer. The mass spectrometer 2 of Embodiment 1 is composed of an inductively coupled plasma mass spectrometer (ICP-MS). In addition, the spectrometer is not limited to the ICP-MS, and for example, an inductively coupled plasma-optical emission spectroscopy (ICP-OES) may also be used. Further, as the ICP-MS and ICP-OES, conventionally known ones may be used, for example, they are described in Japanese Patent Laid-Open Publication No. 2013-130492, and the like, and they are known in the art, such that they will not be described in detail.

The mass spectrometer 2 is connected with a downstream end of a connection tube 3 as an example of a connection part. An upstream end of the connection tube 3 is connected with a merging joint 4. The merging joint 4 is connected with a downstream end of an additional gas tube 6 as an example of an additional gas supply part. In Embodiment 1, the additional gas tube 6 is supplied with argon (Ar) gas as an example of an additional gas (make-up gas). In addition, in Embodiment 1, the argon gas is supplied at a flow rate of about 0.5 to 1.2 L/min as an example.

The merging joint 4 is connected with a downstream end of a cell connection tube 7 as an example of a cell connection part. An upstream end of the cell connection tube 7 is connected with a cell 11. The cell 11 is configured to house a sample S therein. The cell 11 is connected with a carrier gas tube 12 as an example of a carrier gas supply part. In Embodiment 1, the carrier gas tube 12 is supplied with helium (He) gas as an example of carrier gas (a conveying gas). In addition, in Embodiment 1, the carrier gas is supplied at a flow rate of about 0.2 to 1 L/min as an example.

Further, a laser ablation device 21 is disposed above the cell 11. The laser ablation device 21 irradiates the sample S in the cell 11 with a laser beam to ablate the sample S.

The analysis apparatus 1 of Embodiment 1 has a computer device 31 as an example of an information processing device. The computer device 31 has a computer body 32, a display 33 as an example of a display unit, and a keyboard 34 and a mouse 35 as an example of an input unit. The computer body 32 may output a signal to control driving of the laser ablation device 21, receive a detection result from the mass spectrometer 2, and display it on the display 33.

(Description of Laser Ablation Device)

Figure 2:
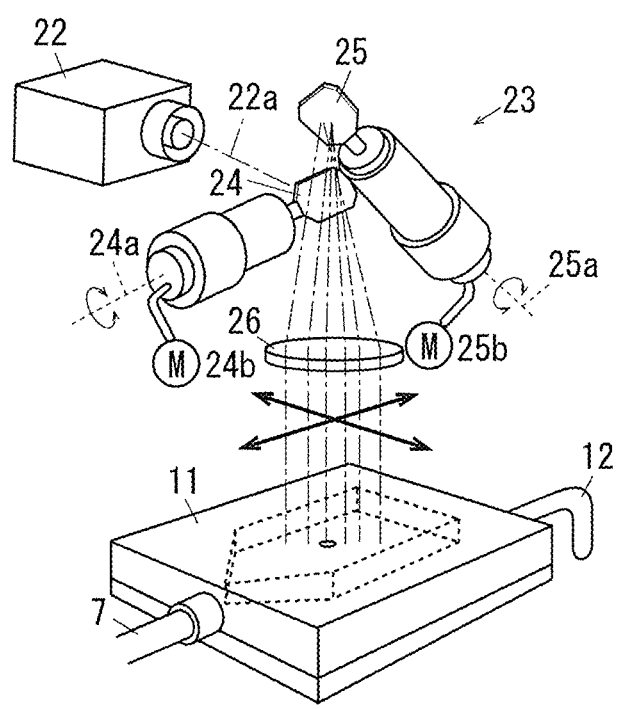
FIG. 2 is a view describing major parts of a laser ablation device of Embodiment 1.

FIG. 2 is a view describing major parts of a laser ablation device of Embodiment 1.

In FIG. 2, the laser ablation device 21 of Embodiment 1 has a femtosecond laser 22 as an example of a laser light source. The femtosecond laser 22 outputs a femtosecond laser beam 22a having a pulse width of a femtosecond order, as an example of the laser beam. The femtosecond laser 22 of Embodiment 1 outputs the femtosecond laser beam 22a having a pulse width of 230 fs as an example, but the pulse width is not limited to the exemplified value and may be changed.

The femtosecond laser 22 of Embodiment 1 includes a shutter (not illustrated) disposed therein, and is configured to control a frequency of outputting the femtosecond laser beam 22a (a reciprocal of an interval at which the femtosecond laser beams 22a are output). In Embodiment 1, as an example, the frequency may be controlled between 100 Hz and 1000 Hz.

That is, the femtosecond laser beam 22a is output from the femtosecond laser 22 at 1000 Hz, the shutter is constantly kept in an open state at 1000 Hz, and nine shots out of ten shots of femtosecond laser beam 22a are shielded by the shutter at 100 Hz, such that it is possible to obtain an output of 100 Hz.

The femtosecond laser beam 22a is introduced into a galvano optical system 23 as an example of an optical system. The galvano optical system 23 of Embodiment 1 has a first galvano mirror 24 as an example of a first mirror and a second galvano mirror 25 as an example of a second mirror. The first galvano mirror 24 reflects the femtosecond laser beam 22a from the femtosecond laser 22 toward the second galvano mirror 25, and the second galvano mirror 25 reflects the femtosecond laser beam 22a from the first galvano mirror 24 toward the sample S.

The first galvano mirror 24 is rotatably supported about a first mirror axis 24a. Driving from a first galvano motor 24b as an example of a first driving source is transmitted to the first mirror axis 24a. Therefore, according to the driving from the first galvano motor 24b, the first galvano mirror 24 rotates and tilts about the first mirror axis 24a to change a reflection direction of the femtosecond laser beam 22a.

Similarly to the first galvano mirror 24, the second galvano mirror 25 also has a second mirror axis 25a, and a second galvano motor 25b as an example of a second driving source to change the reflection direction of the femtosecond laser beam 22a. Further, in Embodiment 1, as an example, the first galvano mirror 24 mainly controls an irradiation position in an X direction along a gas flow direction on a surface of the sample S, and the second galvano mirror 25 mainly controls an irradiation position in a Y direction intersecting the gas flow direction. Therefore, it is possible to scan the femtosecond laser beam 22a in two dimensions by controlling the two galvano mirrors 24 and 25. In Embodiment 1, the femtosecond laser beam 22a is configured to be irradiated in a range of 20 cm×20 cm as an example.

A lens 26 as an example of an optical member is disposed between the second galvano mirror 25 and the cell 11. The lens 26 collects the passing femtosecond laser beam 22a so that a focus position of the femtosecond laser beam 22a is on the surface of the sample S.

(Description of Cell)

Figure 3:
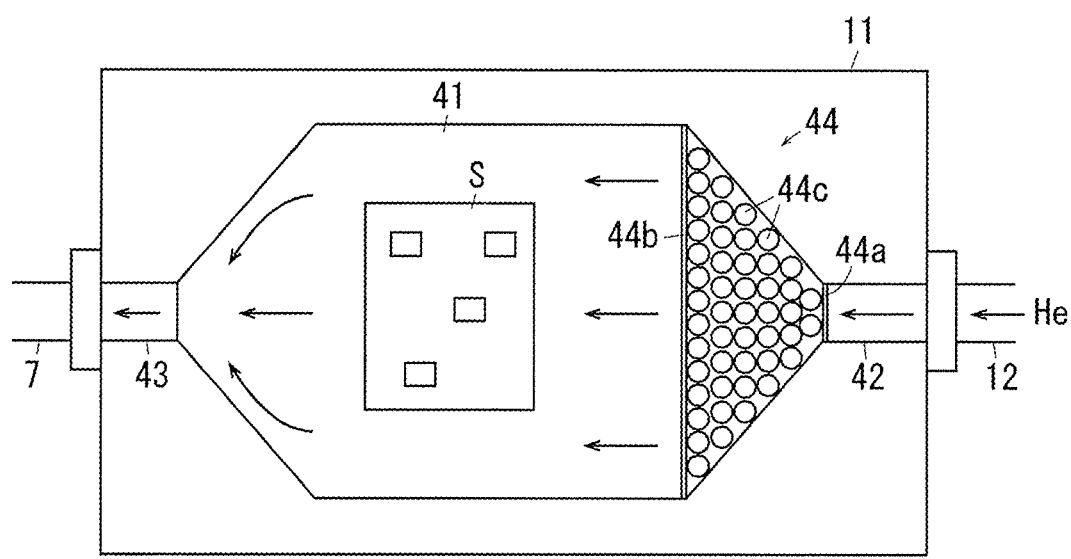
FIG. 3 is a view describing a cell of Embodiment 1.

FIG. 3 is a view describing the cell of Embodiment 1.

In FIG. 3, the cell 11 of Embodiment 1 has a housing part 41 in which the sample S is housed. In addition, the cell 11 includes a gas inflow part 42 as an example of an introduction part, and an aerosol outflow part 43 as an example of a derivation part, which are formed therein. The gas inflow part 42 is connected to the carrier gas tube 12, and the aerosol outflow part 43 is connected to the cell connection tube 7. A diffusion part 44 is formed between the gas inflow part 42 and the housing part 41. The diffusion part 44 has fences 44a and 44b as an example of a partition member. The fences 44a and 44b are disposed on the gas inflow part 42 side and the housing part 41 side of the diffusion part 44. In addition, the fences 44a and 44b of Embodiment 1 are made of a mesh member.

Glass beads 44c, which are made of glass balls, are filled between the fences 44a and 44b. Further, as the glass beads 44c, ones having a particle size of about 0.5 mm to 2 mm are preferably used. Therefore, when the carrier gas inflowing from the gas inflow part 42 passes through the diffusion part 44, the carrier gas continuously collides with the glass beads 44c and diffuses in a direction (Y direction) intersecting the gas flow direction (X direction).

(Description of Control Unit of Embodiment 1)

Figure 4:
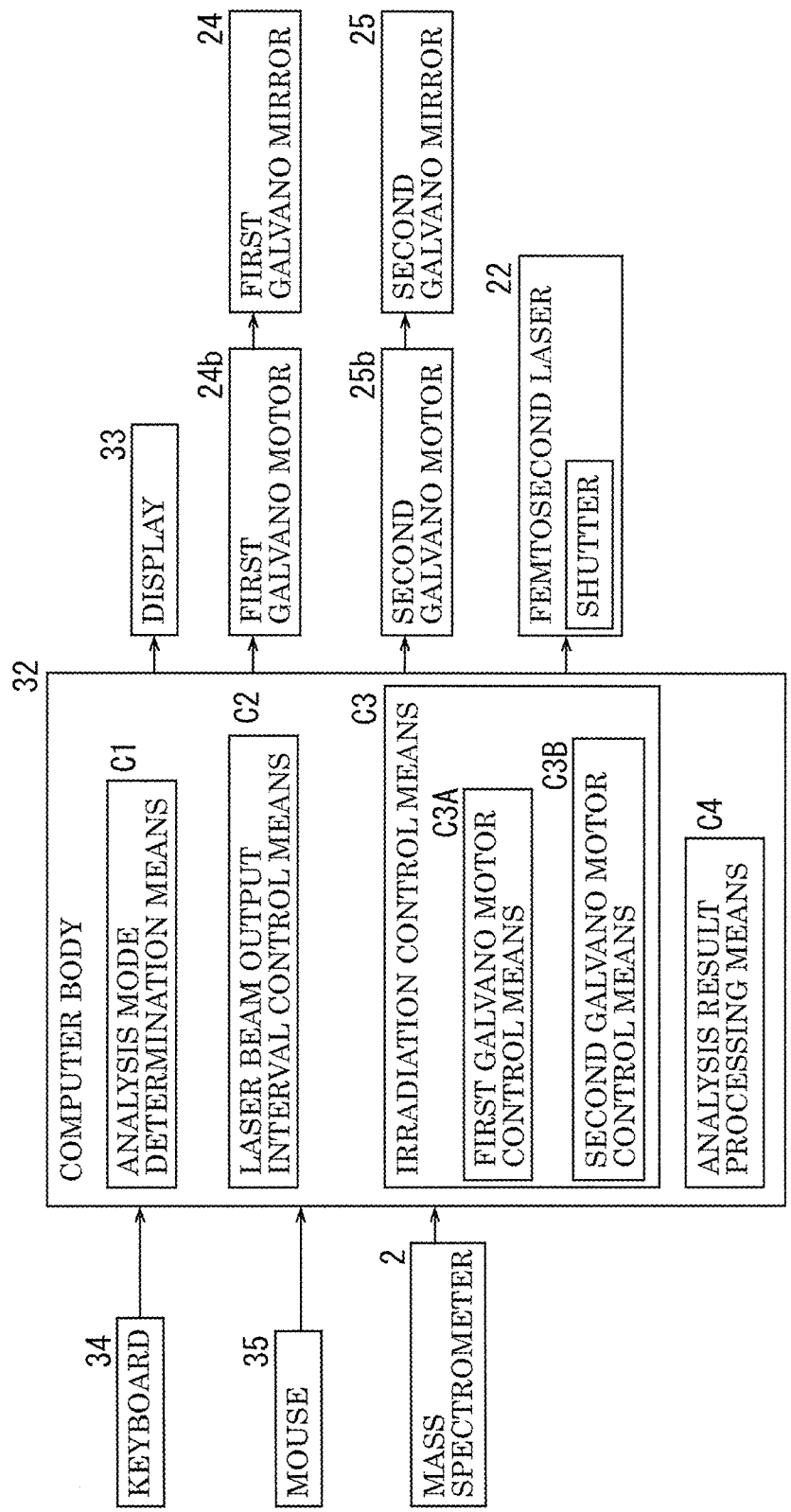
FIG. 4 is a block diagram illustrating each function of a computer device of Embodiment 1.

FIG. 4 is a block diagram illustrating each function of the computer device of Embodiment 1.

In FIG. 4, the computer body 32 as an example of a control unit has an input/output (I/O) interface for inputting/outputting signals with an outside. In addition, the computer body 32 has a read only memory (ROM) in which a program for performing required processing, information, and the like are stored. Further, the computer body 32 has a random access memory (RAM) for temporarily storing required data. Furthermore, the computer body 32 has a central processing unit (CPU) which performs processing according to the program stored in the ROM or the like. Thereby, the computer body 32 may realize various functions by executing the program stored in the ROM or the like.

(Functions of Computer Body 32)

The computer body 32 has functions of executing processing according to input signals from the signal output elements such as the keyboard 34, the mouse 35, the mass spectrometer 2, and other sensors (not illustrated), and outputting control signals to each control element such as the galvano motors 24b and 25b and the shutter of the femtosecond laser 22. That is, the computer body 32 has the following functions.

Figure 5A:
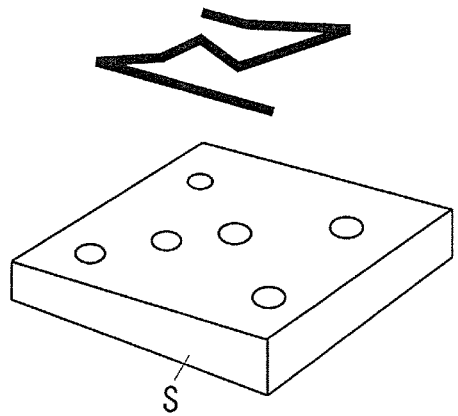
Figure 5B:
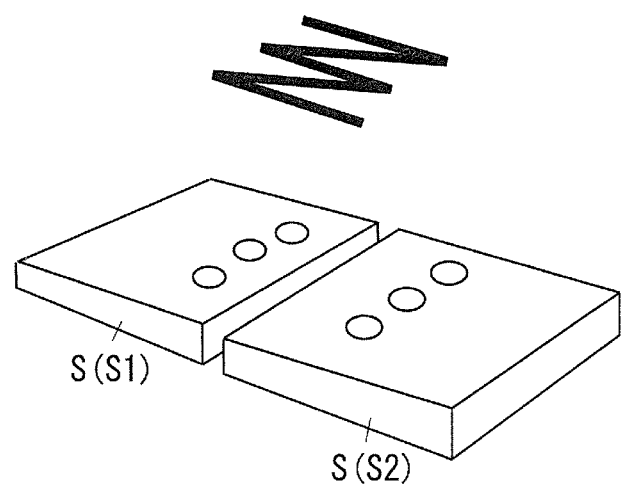
Figure 5C:
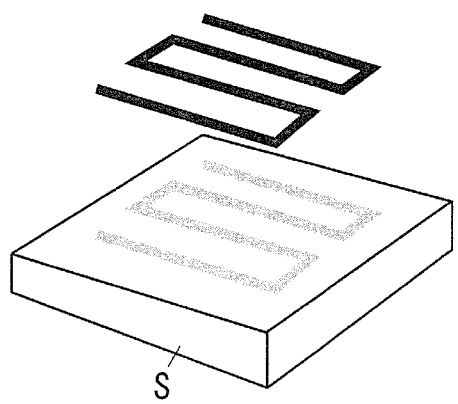
Figure 5D:
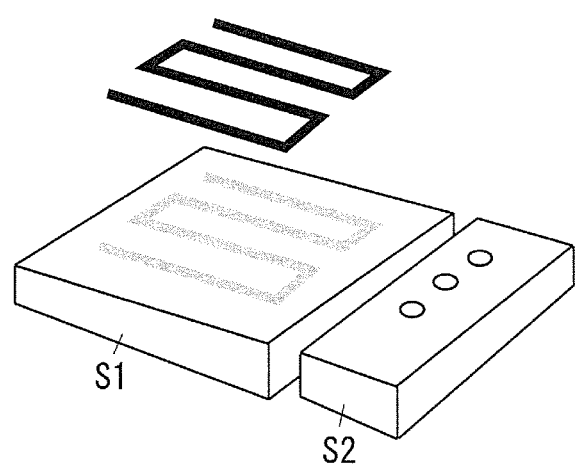

FIGS. 5A to 5D are views describing an analysis mode that can be performed by the analysis apparatus of Embodiment 1, wherein FIG. 5A is a view describing an integration analysis mode, FIG. 5B is a view describing a mixing analysis mode, FIG. 5C is a view describing an elemental imaging analysis mode, and FIG. 5D is a view describing a quantitative analysis mode.

C1: Analysis Mode Determination Means

The analysis mode determination means C1 determines a mode in which analysis is performed based on the input from the keyboard 34 or the mouse 35. In FIGS. 5A to 5D, the analysis apparatus 1 of Embodiment 1 is configured to perform the analysis in the integration analysis mode shown in FIG. 5A, the mixing analysis mode shown in FIG. 5B, the elemental imaging analysis mode shown in FIG. 5C, and the quantitative analysis mode shown in FIG. 5D.

In FIG. 5A, in the integration analysis mode, by ablating a predetermined position of the sample S at a high speed, a chemical composition of the entire ablated region of the sample S is integrated, and analyses is performed by the mass spectrometer 2. Therefore, an average amount of the chemical compositions of the ablated regions is measured.

In FIG. 5B, in the mixing analysis mode, a plurality of samples S or a plurality of locations of one sample are alternately ablated at a high speed to mix and measure the chemical compositions of two samples S or a plurality of locations. In the mixing analysis mode, when mixing two samples S, it is possible to change a mixing ratio by changing the number of times of ablation (the number of spots) between one sample and the other sample. That is, it is also possible to mix the samples at a ratio of 5:1 by ablating, every time one sample is ablated five times, the other sample once. Particularly, when the other sample uses a standard sample (a sample whose chemical composition is known in advance), this is preferably used since the standard sample serves as a reference for measurement.

In FIG. 5C, in the elemental imaging analysis mode, by sequentially ablating a predetermined region of the sample S at a low speed, it is possible to individually measure and analyze the chemical compositions of each of the ablated positions (spots, analysis positions) of the sample S. That is, it is possible to analyze and measure the distribution of the chemical compositions in a predetermined region in a map form.

In FIG. 5D, in the quantitative analysis mode, by alternately ablating the analysis region of the sample S1 to be analyzed and a standard sample S2, the chemical compositions of each spot in the analysis region can be analyzed at a ratio with respect to the standard sample, and quantitative analysis can be performed.

C2: Laser Beam Output Interval Control Means

The laser beam output interval control means C2 controls an output interval (frequency) between the femtosecond laser beams 22a according to the analysis mode. In Embodiment 1, when the integration analysis mode and the mixing analysis mode are selected, the femtosecond laser beam 22a is output at a high speed (high frequency, 1000 Hz), and when the elemental imaging analysis mode or the quantitative analysis mode is selected, the femtosecond laser beam 22a is output at a low speed (low frequency, 10 to 500 Hz).

C3: Irradiation Control Means

The irradiation control means C3 has a first galvano motor control means C3A and a second galvano motor control means C3B, and controls the respective galvano motors 24b and 25b to change reflection angles of the galvano mirrors 24 and 25, such that a target analysis position of the sample S is irradiated with the femtosecond laser beam 22a.

The first galvano motor control means C3A controls the first galvano motor 24b based on an X coordinate of the analysis position of the sample S to control the reflection angle of the first galvano mirror 24. The second galvano motor control means C3B controls the second galvano motor 25b based on a Y coordinate of the analysis position of the sample S to control the reflection angle of the second galvano mirror 25. In addition, when driving the respective galvano motors 24b and 25b according to the analysis positions, the respective galvano motor control means C3A and C3B drive the respective galvano motors 24b and 25b toward positions for stopping them, and then perform driving (counter driving) in a reverse direction to a direction in which they move toward the stop positions when stopping them at the stop positions, thus to stop the respective galvano mirrors 24 and 25 at the stop positions. Further, the galvano motors 24b and 25b can change the irradiation position at a high speed (1000 Hz) according to the output interval (frequency) between the femtosecond laser beams 22a.

C4: Analysis Result Processing Means

The analysis result processing means C4 processes a signal from the mass spectrometer 2 and displays it on the display 33. The analysis result processing means C4 of Embodiment 1 displays analysis results of the measured chemical compositions in the integration analysis mode and the mixing analysis mode, and displays a map image of the ablated region and an image illustrating the chemical compositions when each analysis position on the map is selected in the elemental imaging analysis mode and the quantitative analysis mode.

(Operation of Embodiment 1)

In the analysis apparatus 1 of Embodiment 1 having the above-described configuration, when ablating the target analysis position in the sample S, a position where the femtosecond laser beam 22a is irradiated is controlled by the galvano optical system 23. Herein, in the galvano optical system 23 of Embodiment 1, two galvano mirrors 24 and 25 are independently controlled (biaxially controlled) by the galvano motors 24b and 25b. Therefore, it is possible to ablate any position on two dimensions in the sample S, followed by measuring and analyzing the same. Thereby, it is not necessary to arrange the samples along a straight line as in the conventional technique. Therefore, the analysis apparatus 1 of Embodiment 1 can widen the position where the sample S is placed and the position where analysis can be performed, as compared to the conventional configuration.

Further, in the conventional technique, when the positions to be analyzed cannot be arranged on the straight line, it is necessary to replace the target position to be analyzed at a position (on the straight line) that can be irradiated with the laser beam and analyze the same, thus there is a problem that the whole analysis time is longer. On the other hand, in Embodiment 1, it is possible to irradiate any position on two dimensions with the femtosecond laser beam 22a, the sample S is less likely to need replacing, and the whole analysis time may be shortened.

Figure 6:
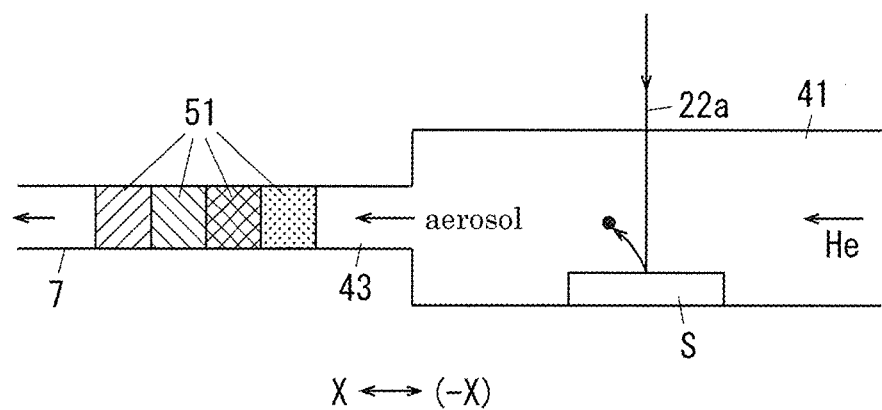
FIG. 6 is a view describing a distribution of ablated samples contained in an aerosol derived from the cell.

FIG. 6 is a view describing a distribution of ablated samples contained in an aerosol derived from the cell.

Further, in the analysis apparatus 1 of Embodiment 1, an interval, at which the sample is irradiated with the femtosecond laser beams 22a (an irradiation interval), is changed according to the analysis mode. The ablated sample is derived from the cell 11 as an aerosol by a carrier gas, but when the irradiation interval between the femtosecond laser beams 22a is short, the galvano optical system 23 also moves at a high speed, and a plurality of analysis positions are ablated in a short time. Therefore, in FIG. 6, when dividing a region 51 into a plurality of regions by the derived aerosol in the gas flow direction, samples ablated at the same time are mixed in each region 51. Therefore, the samples ablated from the plurality of regions are sent to the mass spectrometer 2 in a state in which the samples are mixed, and are detected as an average value (in the integration analysis mode) or to be mixed (in the mixing analysis mode).

On the other hand, when the irradiation interval between the femtosecond laser beams 22a is long, a plurality of analysis positions are ablated at some time intervals. Therefore, in the respective regions 51, the samples ablated at the respective analysis positions are sent to the mass spectrometer 2 with being individually present. Therefore, the chemical compositions at each analysis position can be individually measured and analyzed (in the elemental imaging analysis mode, and the quantitative analysis mode).

Thereby, in Embodiment 1, various analyses can be performed by one analysis apparatus 1 by changing the irradiation interval and frequency of the femtosecond laser beams 22a.

Further, in the analysis apparatus 1 of Embodiment 1, the mixing ratio can be changed by changing a ratio of the spots to be irradiated between one sample and the other sample in the mixing analysis mode. Therefore, as compared to the conventional technique in which the mixing ratio cannot be changed, it is possible for a user to perform the analysis at any mixing ratio desired to be analyzed.

Furthermore, in the analysis apparatus 1 of Embodiment 1, when stopping the galvano mirrors 24 and 25 at the stop positions corresponding to the analysis positions, the counter driving is performed by the galvano motors 24b and 25b. If stopping the galvano motors 24b and 25b without performing the counter driving, the positions of the galvano mirrors 24 and 25 may excessively move (overshoot) from the stop positions due to inertia. When the overshoot occurs, the femtosecond laser beam 22a is not accurately irradiated to the analysis position, and there is a problem that the analysis accuracy is reduced. On the other hand, in Embodiment 1, the galvano mirrors 24 and 25 can be accurately stopped at the stop positions by performing the counter driving. Therefore, the analysis accuracy can be improved as compared to the case in which the counter driving is not performed.

Figure 7:
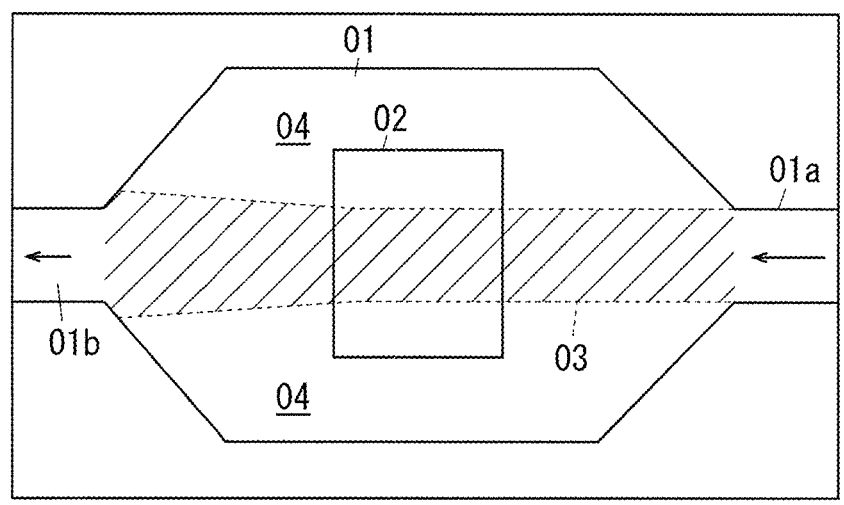
FIG. 7 is a view describing a region where a gas flows in a conventional cell.

FIG. 7 is a view describing a region where a gas flows in a conventional cell.

In FIG. 7, in the conventional technique in which the cell 11 is not provided with the diffusion part 44, when He gas having a low viscosity is used for a sample 02 supported by a housing part 01, it is difficult to diffuse the He gas, and the carrier gas flows only in a substantially linear region 03 toward a derivation part 01b from an introduction part 01a. Therefore, in the region 04 outside the region 03 in which the gas flows, even if the sample 02 is ablated, the carrier gas is not substantially sent and the measurement may be difficult. Therefore, conventionally, it was necessary to place the sample 02 so that the analysis target position of the sample 02 is located on the region 03. Thereby, in the conventional technique, there are problems that a wide range of the sample 02 cannot be measured, and if the sample 02 is replaced to change the position thereof, the analysis takes time.

On the other hand, in the analysis apparatus 1 of Embodiment 1, the cell 11 is provided with the diffusion part 44. Therefore, even if He gas having a low viscosity is introduced as the carrier gas, as shown in FIG. 3, the He gas diffuses in a width direction (Y direction) intersecting the gas flow direction (X direction) and flows almost uniformly. Thereby, it is possible to send the ablated sample S to the downstream side over a wide range of the sample S. Therefore, it is not necessary to replace the sample S, and the time taken for analysis may be shortened.

(Modification of Diffusion Part)

Figure 8A:
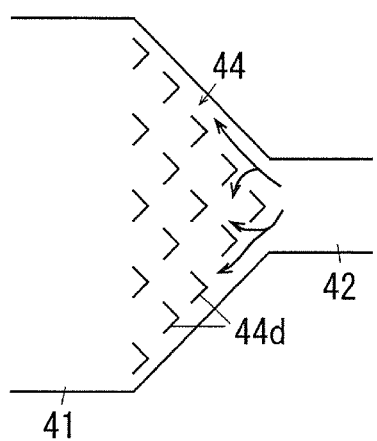
Figure 8B:
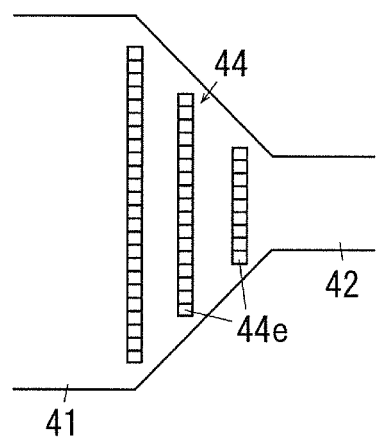

FIGS. 8A and 8B are views describing modifications of a diffusion part of the cell, wherein FIG. 8A is a view describing Modification 1, and FIG. 8B is a view describing Modification 2.

In the above-described embodiments, the diffusion part 44 using the glass beads 44c has been exemplified as shown in FIG. 3, but it is not limited thereto. As shown in FIG. 8A, a configuration, in which a plurality of screen-shaped diffusion walls 44d which radially expand toward the downstream side in the gas flow direction are arranged as the diffusion part 44, may also be possible. In addition, as shown in FIG. 8B, a configuration, in which a carrier gas is allowed to pass therethrough, but a plurality of filter members 44e that serve as flow path resistance are disposed, may also be possible. Further, in addition to the configurations illustrated in FIGS. 8A and 8B, any configuration capable of diffusing the gas flow in the width direction (Y direction) by disposing a member that serves as a flow path resistance of the introduced carrier gas may be employed.

(Modification)

Although the embodiments of the present invention have been described above in detail, the present invention is not limited to the above-described embodiments, and various modifications may be made within the scope of the present invention described in the claims. Modifications (H01) to (H08) of the present invention will be described as an example below.

(H01) In the above-described embodiments, as the sample S, the case of one sample or two samples has been exemplified, but three or more samples may also be possible.

(H02) In the above-described embodiments, the galvano optical system 23 having the biaxial control configuration has been exemplified, but it may also be configured to have a triaxial control or more.

(H03) In the above-described embodiments, the specific shape can be optionally changed according to the design, specifications and the like. For example, the shape and the like of the housing part 41 of the cell 11 can be optionally changed.

(H04) In the above-described embodiments, it is preferable to use the glass beads 44c for the diffusion part 44, but it may also be configured to use a material other than the glass. For example, it is possible to use metal particles (beads) or plastic beads. In addition, when using plastic beads, mercury (Hg) attached to the plastic beads may be easily detected by the mass spectrometer, therefore it is desirable to use the glass beads.

(H05) In the above-described embodiments, it is preferable to use He gas as the carrier gas, but it is not limited thereto. For example, it is possible to change to hydrogen gas, neon gas, or argon gas according to the type of sample to be analyzed and the required accuracy.

(H06) In the above-described embodiments, the configuration, in which four analysis modes are possible, has been exemplified, but it is not limited thereto. It may also adopt a configuration having one, two or three analysis modes, or a configuration having five or more modes as the analysis mode. Thereby, when there is only one analysis mode or when the irradiation interval between the femtosecond laser beams 22a is common in the executable analysis modes, it may also adopt a configuration, in which the irradiation interval is not adjusted, that is, the shutter of the femtosecond laser 22 is not provided.

(H07) In the above-described embodiments, as the configuration for adjusting the irradiation interval between the femtosecond laser beams 22a, the configuration using the shutter has been exemplified, but it is not limited thereto. For example, it is not impossible to dispose a shielding optical system that reflects the femtosecond laser beam 22a in a direction in which the sample S is not irradiated between the femtosecond laser 22 and the galvano optical system 23, or configure so as to reflect the laser beam in a direction in which the sample S is not irradiated with the galvano optical system 23.

(H08) In the above-described embodiments, when using the carrier gas having a relatively high viscosity, it may also be possible to adopt a configuration having no diffusion part.

The invention claimed is:

1. A laser ablation device, comprising:
a laser light source configured to output a femtosecond pulse laser beam for ablating a sample housed in a cell, wherein the femtosecond pulse laser beam has a pulse width of a femtosecond order;
an optical system configured to reflect the femtosecond pulse laser beam from the laser light source toward the sample, wherein the optical system comprises:
a first mirror rotatable about a first axis,
a second mirror rotatable about a second axis which is different from the first axis,
a first galvano motor configured to rotate the first mirror about the first axis, and
a second galvano motor configured to rotate the second mirror about the second axis, wherein the femtosecond pulse laser beam from the laser light source is reflected by the first mirror, and the femtosecond pulse laser beam reflected by the first mirror is reflected by the second mirror toward an analysis position of the sample; and
a computer configured to control the first galvano motor and the second galvano motor based on a coordinate position on two dimensions of the analysis position of the sample to change reflection angles of the first mirror and the second mirror, such that the analysis position is irradiated with the femtosecond pulse laser beam, wherein, the computer is configured to, when mixing and analyzing ablated samples at a plurality of analysis positions for a mixing analysis mode, set an interval between the femtosecond pulse laser beams irradiated to the sample to a predetermined low frequency, and when analyzing the ablated samples at each of the plurality of analysis positions individually for an imaging analysis mode, set the interval between the femtosecond pulse laser beams irradiated to the sample to a predetermined high frequency.

2. The laser ablation device according to claim 1, wherein the computer is further configured to, when driving the first galvano motor and the second galvano motor according to the plurality of analysis positions, drive the first galvano motor and second galvano motor to stop positions, respectively, and then perform driving in a reverse direction to a direction in which the first galvano motor and the second galvano motor move toward the stop positions when stopping the first galvano motor and the second galvano motor at the stop positions, thus to stop the respective first and second mirrors at the stop positions.

3. An analysis apparatus, comprising:

a cell configured to house a sample;

the laser ablation device according to claim 2, which is configured to ablate the sample; and a spectrometer into which the sample that has been ablated and sent out from the cell is introduced, and which is configured to perform an analyses of the introduced sample by an inductively coupled plasma method.

4. The laser ablation device according to claim 1, wherein the computer is configured to control the laser light source to output the femtosecond pulse laser beam at the predetermined high frequency to the sample for analyzing an average value of the ablated samples from the sample at the plurality of analysis positions.

5. The laser ablation device according to claim 1, wherein the computer is configured to control the laser light source to output the femtosecond pulse laser beam at the predetermined low frequency to the sample for analyzing the ablated samples from the sample at the plurality of analysis positions, respectively.

* * * * *